(12) United States Patent
Ito et al.

(10) Patent No.: US 11,014,554 B2
(45) Date of Patent: May 25, 2021

(54) VEHICLE CONTROL APPARATUS AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Yosuke Ito, Kariya (JP); Toru Takahashi, Kariya (JP); Wataru Ike, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 16/064,729

(22) PCT Filed: Dec. 26, 2016

(86) PCT No.: PCT/JP2016/088669
§ 371 (c)(1),
(2) Date: Jun. 21, 2018

(87) PCT Pub. No.: WO2017/111156
PCT Pub. Date: Jun. 29, 2017

(65) Prior Publication Data
US 2019/0009775 A1    Jan. 10, 2019

(30) Foreign Application Priority Data
Dec. 25, 2015  (JP) .............................. JP2015-254472

(51) Int. Cl.
*B60W 30/09*   (2012.01)
*B60T 7/12*    (2006.01)
(Continued)

(52) U.S. Cl.
CPC ............... *B60W 30/09* (2013.01); *B60T 7/12* (2013.01); *B60T 7/22* (2013.01); *B60W 10/18* (2013.01);
(Continued)

(58) Field of Classification Search
CPC .... B60W 30/09; B60W 30/085; B60W 10/18; B60W 2554/00; B60T 7/12; B60T 7/22; B60T 2201/022; G08G 1/166
See application file for complete search history.

(56) References Cited

U.S. PATENT DOCUMENTS

2013/0041564 A1*   2/2013   Doi ..................... B60W 50/087
                                                            701/70
2015/0046054 A1    2/2015   Takahashi et al.

FOREIGN PATENT DOCUMENTS

JP    2013-129228          7/2013
JP    2013129228   A  *    7/2013
(Continued)

*Primary Examiner* — Aaron L Troost
(74) *Attorney, Agent, or Firm* — Maschoff Brennan

(57) ABSTRACT

In a vehicle control apparatus, an object recognizing block recognizes an object which is present around a vehicle. In cases where there is a possibility that the vehicle will collide with an object recognized by the object recognizing block, the apparatus performs automatic braking control which brakes the vehicle. If the driver depresses the accelerator pedal in a predetermined depressing state, a braking controlling block cancels the automatic braking control. When an operation determining block determines that there is a driver's predetermined shift-lever position change, with which the driver's predetermined shift-lever position change is carried out during a driver's accelerator pedal depressing operation, the braking controlling block responds to a driver's accelerator depressing operation by not cancelling the automatic braking control or by making cancellation of the automatic braking control more difficult.

17 Claims, 3 Drawing Sheets

(51) Int. Cl.
  *B60W 30/085* (2012.01)
  *B60T 7/22* (2006.01)
  *B60W 10/18* (2012.01)
  *G08G 1/16* (2006.01)

(52) U.S. Cl.
  CPC ...... *B60W 30/085* (2013.01); *B60T 2201/022* (2013.01); *B60W 2554/00* (2020.02); *G08G 1/166* (2013.01)

(56) References Cited

FOREIGN PATENT DOCUMENTS

| | | |
|---|---|---|
| JP | 2014-118048 | 6/2014 |
| JP | 2015-036270 | 2/2015 |

\* cited by examiner (a)

(b)

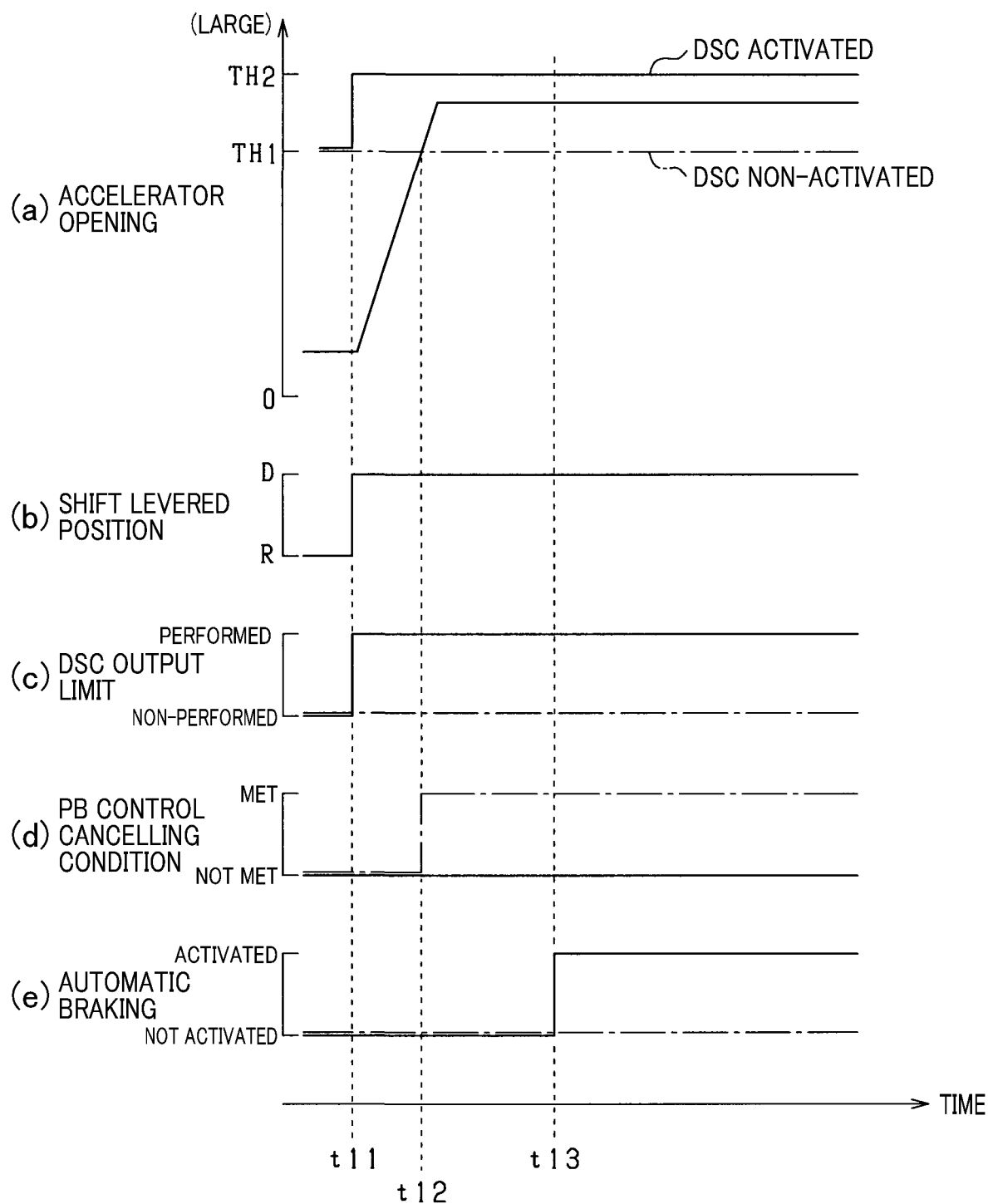

VEHICLE CONTROL APPARATUS AND VEHICLE CONTROL METHOD

CROSS-REFERENCE TO RELATED APPLICATIONS

This application is based on and claims the benefit of priority from earlier Japanese Patent Application No. 2015-254472 filed Dec. 25, 2015, the description of which is incorporated herein by reference.

TECHNICAL FIELD

The present disclosure relates to a vehicle control apparatus and a vehicle control method, and in particular, to a vehicle control apparatus and a vehicle control method which are intended to avoid the vehicle from colliding with obstacles or alleviate damage of the vehicle colliding with obstacles.

BACKGROUND ART

A pre-crash safety system has been developed as one of conventional safety systems for avoiding collision between the vehicle and obstacles which are present therearound or alleviating damage of the vehicle colliding with obstacles. In this pre-crash safety system, it is checked whether or not there is a risk that a vehicle provided with this system (i.e., a own vehicle) will collide with an obstacle, and if such a risk is detected, the system issues an alarm to a driver of the vehicle and/or activates a braking system for automatic braking. In addition, the system proposes a release of the automatic braking if the driver depresses the accelerator pedal under the automatic braking control performed for avoiding a collision. In this system, it is stated that this release will enable the vehicle to promptly start acceleration thereof (for example, refer to PTL1).

The system according to PTL1 also proposes control for driving support. This driving support is provided as a vehicle control apparatus which performs automatic braking control for avoiding a collision with obstacle, as well as accidental accelerator depression control. This accelerator accidental-depressing prevention control is activated when it is detected that there is an obstacle in a vehicle traveling direction when the vehicle is just about to start or the vehicle is traveling at a lower speed, and it is determined that the driver has depressed strongly on the accelerator. When being activated, the accelerator accidental-depressing prevention control detects such an occasion as an acceleration accidental-depressing occasion, and will limit the engine power from being raised, regardless of the driver's accelerator depressing action. In addition to the above, this PTL 1 discloses an issue that releasing the automatic braking of this vehicle is avoided in the limitation control of the engine power which is activated due to the accidental depress on the accelerator.

Another driving assistance control of a vehicle is known as a technique where the engine power of the vehicle is limited from being excessively raised when the driver has performed accelerator pedal operations and shift lever operations which are different from those performed in the ordinary driving with no such accelerator pedal and shift lever operations.

CITATION LIST

Patent Literature

[PTL 1] JP-A-2013-129228

SUMMARY OF THE INVENTION

In a vehicle control apparatus capable of performing automatic braking control for avoiding collisions of a vehicle with obstacles, the automatic braking control can be canceled depending on depressing actions on the accelerator pedal in cases where accelerator pedal operations and shift lever operations are performed which are different from those performed in the ordinary driving, due to accidental depressing operations on the accelerator pedal. In such cases, there may be events where the automatic braking is not activated even if there is an obstacle object in front of the vehicle A one objective of the present disclosure is to provide a vehicle control apparatus and a vehicle control method which are able to assist the driver so as to avoid a collision of the vehicle with an object which is present in a forward field of the vehicle or reduce damage caused by the collision in a case there is a probability that the vehicle collides with the object.

Solution to Problem

In order to solve the foregoing objective, the present disclosure employs the following configuration.

The present disclosure provides, as a first mode thereof, a vehicle control apparatus (10), comprising: an object recognizing block that recognizes an object around a vehicle; a braking controlling block that performs automatic braking control for braking the vehicle when there is a possibility that the vehicle collides with the object recognized by the object recognizing block, and cancels the automatic braking control when a driver in the vehicle presses an accelerator pedal of the vehicle into a predetermined pressing state; and an operation determining block that determines whether or not the driver has performed a predetermined shift-lever position change, the predetermined shift-lever position change being defined as a driver's operation of changing positions of a shift lever of the vehicle in a state where the driver presses an accelerator pedal of the vehicle. In this configuration, the braking controlling block prohibits cancellation of the automatic braking control or resists the cancellation of the automatic braking control in response to the driver's pressing operation on the accelerator pedal, in a case where the operation determining block determines that the predetermined shift-lever position change has been performed.

The foregoing configuration makes it possible to properly cope with a situation where the driver presses the accelerator pedal and change the shift lever in a different way from the way those operations are performed in the ordinarily and, depending on when the accelerator pedal is pressed, there is a probability that the vehicle will collide with an object. That is, in such a case, automatic braking control which automatically brakes the vehicle will not be canceled or is resisted so that the automatic braking is not canceled easily. Hence, when there is an object(s) with which the vehicle may collide, it is possible to provide an appropriate driving assistance to the driver in terms of avoiding collision(s) with the object(s) or reducing damage caused by the collision(s).

BRIEF DESCRIPTION OF THE DRAWINGS

With reference to the accompanying drawings and corresponding detailed descriptions, the foregoing object of the present disclosure will be detailed together with its other objects, features and advantages, where the drawings are such that:

FIG. 3 is a timing chart showing how collision preventing control is practically carried out when DSC (drive start control) is activated.

DESCRIPTION OF EMBODIMENTS

Figure 1:
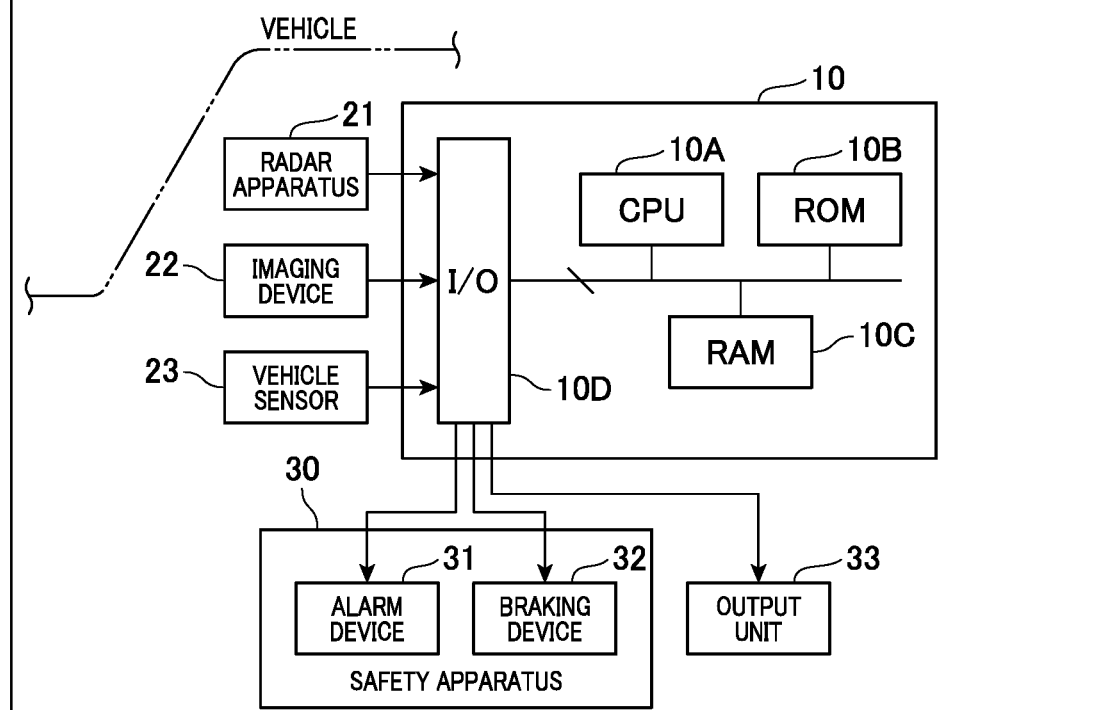
FIG. 1, in (a) and (b) thereof, outlines a hardware block diagram and a functional block diagram of a vehicle control apparatus, respectively.
Figure 1:
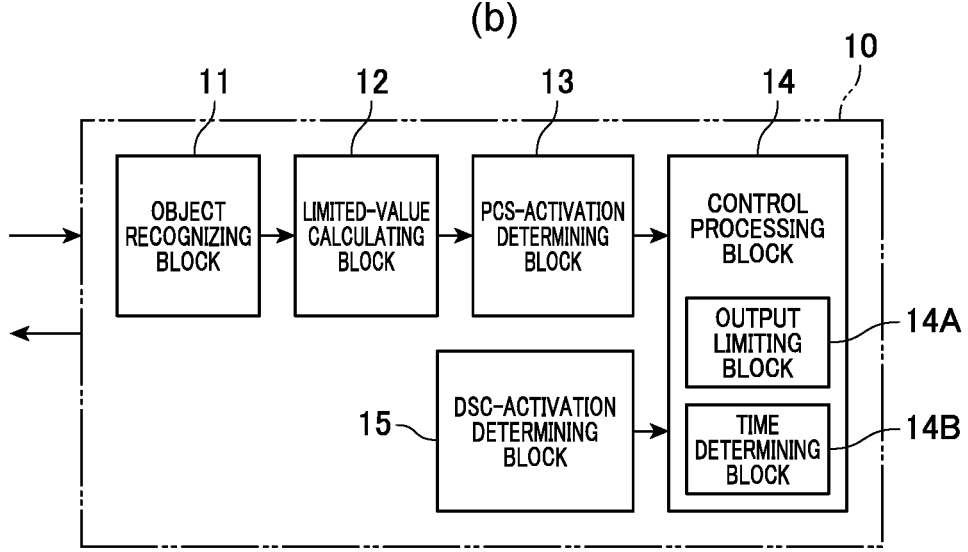

With reference to drawings, an embodiment will now be described. In the following embodiments, components which are similar or equivalent in their functions to each other are given the same reference numerals for the sake of avoiding redundant explanations. The present embodiment provides a vehicle control apparatus. This vehicle control apparatus is capable of sensing objects which are around an own vehicle (simply, a vehicle) provided with the vehicle control apparatus, and assists driving by activating on-vehicle safety devices based on sensed various types of sensed information. Thus, this enables the vehicle control apparatus enables to act as a pre-crash safety system which performs various types of control for avoiding collisions between the vehicle and obstacles or reducing damage due to the collisions.

As shown in (a) of FIG. 1, there is provided a vehicle control apparatus 10 configured as a computer which includes a CPU (central processing unit) 10A, a ROM (read only memory) 10B, a RAM (random access memory) 10C, and an I/O (input/output) interface 10D. The CPU 10A executes programs installed in advance in the ROM 10B, whereby the CPU 10A realizes various functions. The ROM 10B is provided as a computer-readable recording medium serving as a non-transitory computer readable recording medium. Instead of the ROM 10B, this recording medium can be provided as a DVD-ROM (Digital Versatile Disk Read Only Memory), a CD-ROM (Compact Disc Read Only Memory), and a hard disk, which are computer-readable electronic mediums. The vehicle control apparatus 10 is communicable connected to a radar apparatus 21 and an imaging device 22, which serve as object sensors sensing objects which are present around the vehicle provided with the vehicle control apparatus. The vehicle control apparatus 10 thus receives sensed information about the objects from the sensors.

The radar apparatus 21 is provided, by way of example, as a known millimeter-wave radar apparatus which transmits a millimeter-wave band high-frequency signal. This radar apparatus 21 is mounted on the front part of the vehicle, so that the radar apparatus 21 can sense objects which are present within a detection range having a predetermined detection angle. By this sensing, distances to the objects, relative speeds of the objects, and azimuth directions of the objects can be acquired. Further, the imaging device 22 is provided, by way of example, by a CCD (Charged-Coupled Device) camera, a CMOS (Complementary Metal-Oxide Semiconductor) imaging sensor, or a near-infrared camera. This imaging device 22 is installed at a front part of the vehicle, the front part of which is located at a center in the vehicle width direction and has a predetermined height. By this installation, the imaging device can image a predetermined-angular viewing range in front of the vehicle from a downward view point on the front of the vehicle. In this imaging process, acquired images are subjected to extraction of feature points indicating presence of objects, and information showing the extracted feature points is provided to the vehicle control apparatus 10.

In addition, as vehicle sensors 23 for detecting information showing running states of the vehicle, there are provided an accelerator sensor detecting an accelerator opening which corresponds to an operated amount on an accelerator pedal, a braking sensor detecting an operated amount on a brake pedal, a shift position sensor detecting shift positions of a gearshift, a steering angle sensor detecting a steered angle of a wheel (steering wheel), a yaw rate sensor detecting an angular speed (yaw rate) in a turning direction of the vehicle, a vehicle speed sensor detecting a speed of the vehicle, an accelerator sensor detecting an acceleration of the vehicle, and other necessary sensors.

As show in (b) of FIG. 1, the vehicle control apparatus 10 is provided with an object recognizing block 11, a limited-value calculating block 12, a PCS-activation determining block 13, a control processing block 14, and a DSC (drive start control)-activation determining block 15.

The object recognizing block 11 is configured to acquire detection information of objects from the radar apparatus 21 and the imaging device 22 and recognize that the objects are present at positions decided using positional information of the objects from the radar apparatus 21 and the imaging device 22. In addition, for each of the objects, the object recognizing block 11 is configured to mutually coordinate a relative position of each object to the own vehicle and a relative speed of each object to the own vehicle, and use the mutually coordinated relative positions and relative speeds to calculate a lateral speed and a longitudinal speed of the vehicle. The lateral speed is a relative speed of each object to the own vehicle in a direction perpendicular to a vehicle traveling direction, while the longitudinal speed is a relative speed of the object in the vehicle traveling direction.

The object recognizing block 11 is configured to combine objects detected by the radar apparatus 21 and objects detected by the imaging device 22 so as to produce fusion objects. Specifically, the relative speeds and distances of the objects detected by the radar apparatus 21 are subjected to calculation for specifying longitudinal positions of the fusion objects. Also lateral widths and lateral positions of the targets detected by the imaging device 22 are subjected to specifying lateral positions of the fusion targets. Further, the object recognizing block 11 is configured to use information of the objects detected by the imaging device 22, such that a pattern matching process is applied to the detected information with use of predetermined patterns, with the result that the objects are distinguished, from on another, in terms of being vehicles, pedestrians or bicycles. In addition, the object recognizing block 11 is configured to receive various types of information detected by the various sensors belonging to the vehicle sensor 23.

The limited-value calculating block 12 is configured to divide, in calculation, an inter-vehicular distance (based on longitudinal positions) between the own vehicle and each of the objects, by a relative speed to each object. This enables the limited-value calculating block 12 to calculate a TTC (Time to Collision), which shows a time estimated until a collision of the vehicle with each object. In this block 12, for calculating the TTC, information of relative accelerations can also be used together with information of the relative speeds if it assumed that the vehicle is moving to objects in a uniformly-accelerated linear travel.

In addition, the limited-value calculating block 12 is configured to calculate a lateral-position limited value which defines a width of operation of the safety device 30 in the lateral direction. The safety device 30 functions as a device to prevent the own vehicle from colliding with an object or reduce damage occurring from collisions. The safety device 30 is activated when a lateral position of an object recognized by the objet recognizing block 11 is within a limited value and a calculated TTC does not reach an activation timing yet. The limited value is calculated by correcting a predetermined reference value depending on, for example, a curvature of the running road on which the vehicle is now running and other factures such as a relative speed of the vehicle to the object.

As shown in part (a) of FIG. 1, the vehicle is equipped with an alarm device 31 and a braking device 32 which compose the safety device 30. The alarm device 31 is provided as a speaker and/or a display installed, for example, in the compartment of the vehicle. Responsively to an activation command from the vehicle control apparatus 10, issues an alarming sound and/or an alarming massage, thereby notifying the driver of a possible collision risk to an object. The braking device 32 can brake the vehicle. Practically, using the braking device 32, the vehicle control apparatus 10 provides braking functions for avoiding collisions with objects or reducing collision damage. Such braking functions consist of a braking assist function which strengthens a braking power caused by a driver's braking to operation for braking assistance, and an automatic braking function for automatically braking the vehicle when there is no driver's braking operation. When receiving an activation command from the vehicle control apparatus 10, the braking device 32 provides braking control based on such braking functions. Of course the safety device 30 may include a seatbelt device which draws a seatbelt installed at each seat of the vehicle and/or a steering device for automatic steering.

The PCS-activation determining block 13 is configured to make a comparison between an activation timing provided to the safety device 30 and the TTC calculated by the limited-value calculating block 12. And this block 13 is configured to transmit to the control processing block 14 an activation command for activating the safety device 30 when the value of the TTC becomes correspond to the activation timing. The activation timing is set in advance to each of the safety functions of the safety device 30, in which the activation timing is inherently decided for each safety function. Data showing the activation timing is stored in a memory device, e.g., the ROM 10B, of the vehicle control apparatus 10.

The control processing block 14 is configured to receive, from the PCS-activation determining block 13, the activation command, and activate a necessary safety function of the safety device 30. By this activation, control for braking the own vehicle (hereinafter, referred to as "own-vehicle braking control" or "PB (parking brake) control) and/or alarming the driver using the alarm device 31 are conducted in cases there is a risk of collision of the vehicle with an object recognized by the object recognizing block 11. In the present embodiment, activation of the automatic braking enables the vehicle to be stopped from running, and a predetermined period of time (for example, several seconds) from the stop of the vehicle due to the automatic braking, the automatic braking is continued.

In a case the driver presses the accelerator pedal deeply or presses the acceleration pedal in a higher pressing speed, it is assumed that the driver intends to accelerate the vehicle. In such a case, if the automatic braking is activated, the vehicle is braked against the driver's desire for the acceleration, resulting in giving to unnatural feeling of the driver.

With consideration of such a case, the present embodiment sets PB-control cancelling conditions which include a condition showing that a driver's accelerator operation becomes a predetermined pressing state. In the present embodiments, if this PB-control cancelling condition is met, the PB control performed by the control processing block 14 is cancelled.

In the present embodiment, the predetermined pressing state of the accelerator pedal is set to include a first condition where the accelerator opening detected by the accelerator sensor is larger than an opening threshold TH and a second condition where an accelerator opening rate is higher than a rate threshold TV. Further, the predetermined operation state is set to include a third condition where, under a vehicle braked state on the automatic braking control, an amount of change in the accelerator opening, which is gained after starting the automatic braking, is larger than a change threshold TA. When all of these conditions are met, the vehicle control apparatus cancels the automatic braking control. In the present embodiment, the control processing block 14 thus functions as a braking control block.

Canceling the PB control means that the automatic braking is stopped and is disabled even when the value of the TTC becomes correspond to the activation timing. To be specific, when the driver presses the accelerator pedal in a state a braking force is generated in the vehicle thanks to the PB control such that the accelerator operation meets any of the conditions regulated as the predetermined pressing state of the accelerator pedal, the braking force is stopped from being generated in the vehicle. In addition, in response to a driver's accelerator pedal operation, this operation may meet any of the conditions regulated as the predetermined pressing state. In this case, even when it is recognized that there is an object within the activating range of the safety device 30, the braking force toward the recognized object will not be generated, because it is considered that the driver intends to accelerate the vehicle.

The vehicle according to the present embodiment is equipped with a drive start control (DSC) system, which is configured to limit the engine output of the vehicle when the driver performs an accelerator pedal operation and a shift lever operation which are different from those performed in the ordinary driving.

Practically, the DSC-activation determining block 15 is configured to receive, as driver's operating information, signals showing both an accelerator opening from the accelerator sensor and the shift-lever position sensor, both of which are provided in the vehicle sensor 23, and also to receive, as vehicle information, signal showing both a vehicle speed from the vehicle speed sensor and a vehicle acceleration from the acceleration sensor, both of which are also provided in the vehicle sensor 23. In addition, the DSC-activation determining block 15 is configured to detect an accelerator operation and a shift-lever operation which are different from those in the ordinary driving. Specifically such a detection is directed to a predetermined shift-lever position change where the driver changes shift-lever positions in a state where the driver presses the accelerator pedal. If this predetermined shift-lever position change is detected, the DSC-activation determining block 15 transmits to the control processing block 14 an output limiting command to limit the engine output of the vehicle. In the present embodiment, it is determined that the predetermined shift-lever position change has been performed, when the shift lever changes in its positions in a state where the accelerator pedal opening is equal to or larger than a predetermined amount. The DSC-activation determining block 15 functions as an operation determining block.

As shown in the part (b) of FIG. 1, the control processing block 14 is functionally provided with an output limiting block 14A and an elapse determining block 14B. The output limiting block 14A receives an output limiting command issued by the DSC-activation determining block 15 (via the PCS-activation determining block 13). In response to this reception, the output limiting block 14A controls the engine and/or the motors in the output apparatus 33 such that the output power of the vehicle is limited. This prevents the vehicle from increasing its output power excessively in a case where the accelerator pedal is pressed erroneously, which is for example a shift-lever position change from the reverse range R to the drive range D or from the drive range D to the reverse range R during a driver's pressing operation on the accelerator pedal, for example, in a parking lot. In addition, when the vehicle speed and acceleration become lower than predetermined values after the predetermined shift-lever position change has been detected, the output power limitation on the DSC control is canceled.

By the way, in cases the driver operates the accelerator pedal and the shift lever in a different way from that performed in the usual (ordinary) driving, the PB control may be canceled due to the operation onto the accelerator pedal. In such a PB control canceled state, the PB control is not effective even if there is present an object in front of the vehicle, whereby the automatic braking may not be active in such a case.

With consideration of such a case, the control processing block 14 of the present embodiment adopts a control scheme such that the PB control is not cancelled or suppressed from being canceled in response to a driver's operation to the accelerator pedal included in the driver's predetermined shift-lever position change operation. Practically, the opening threshold TH, the speed threshold TV, and the change threshold TA all for the PB canceling conditions are set at amounts used in the ordinary driving and the DSC control, respectively. In a period of time for which the DSC control limits the output power of the vehicle, the vehicle control apparatus 10 changes the opening threshold TH to a larger value, the speed threshold TV to a larger value, and the change threshold TA to a larger value, compared to threshold values assigned when not limiting the output power.

With reference to a flowchart shown in FIG. 2, a process for the PB control executed by the vehicle control apparatus 10 will now be described. The process shown in FIG. 2 is configured to be performed repeatedly every preset control period for each of objects in front of the vehicle in the traveling direction thereof.

Figure 2:
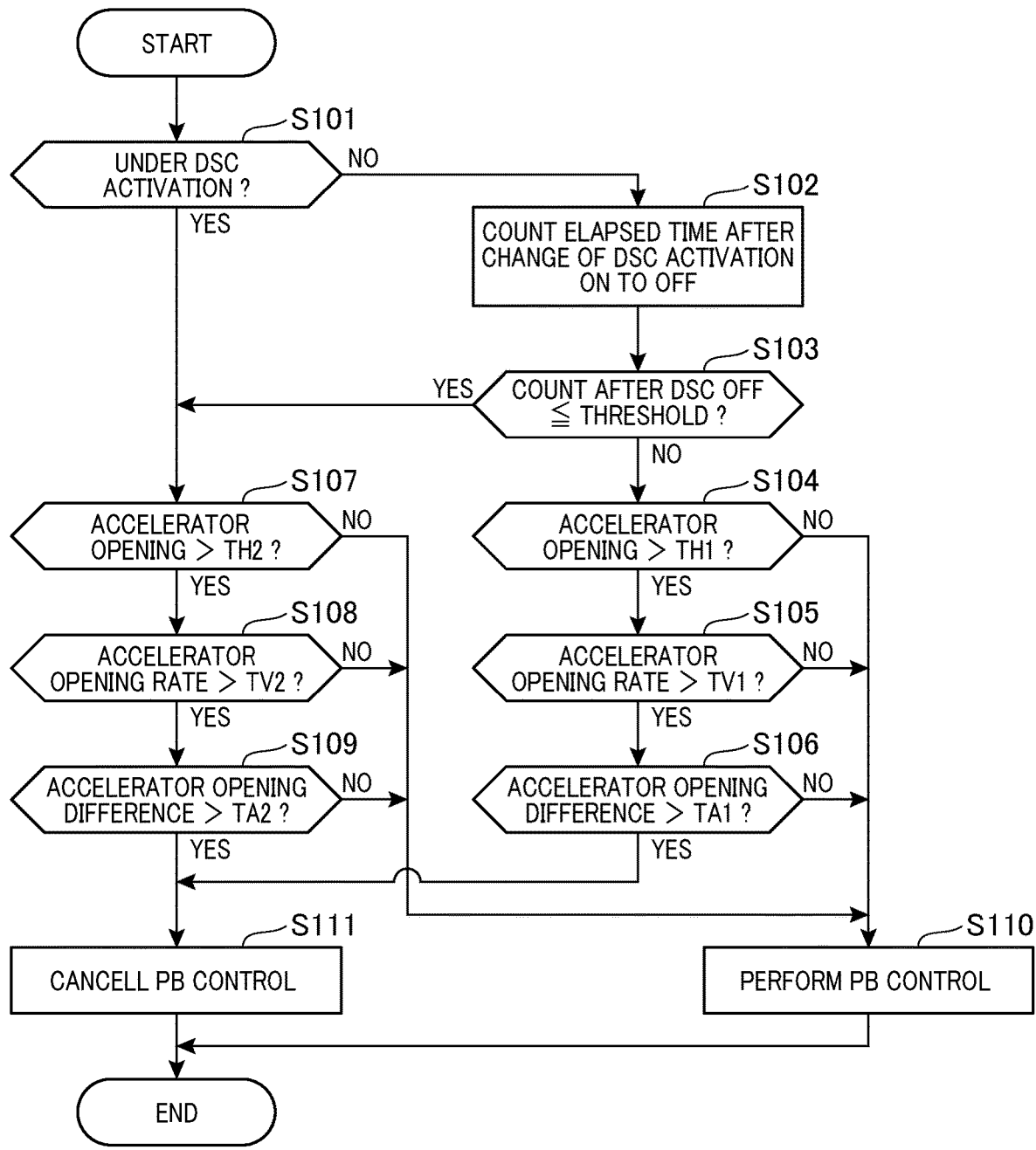
FIG. 2 is a flowchart showing processing steps for PB control.

In the flowchart of FIG. 2, by the vehicle control apparatus 10, it is determined whether or not the output power of the vehicle is now limited on the DSC control. When such output power limitation on the DCS control is not executed now, the processing proceeds to step S102, where an after-OFF counter Cn is started. The count measured by the after-OFF counter Cn indicates a period of time elapsed after completion of the output power limitation on the DSC control. At step S102, the after-OFF counter Cn starts its counting at a time instant at which the output power limitation on the DSC control is completed, and continues its counting-up operation.

Then at step S103, by the vehicle control apparatus 10, it is determined whether or not the count of the after-OFF counter Cn is equal to or less than a threshold. These steps S102 and S103 functionally realizes an elapse determining block 14B. when the count of the center Cn is larger than the threshold, the processing proceeds to step S104, where it is further determined whether or not the accelerator opening detected by the accelerator sensor is larger than an opening threshold TH1 (for example, 80% or 90%). This opening threshold TH1 is set as an ordinary-driving opening threshold which is adopted in a state where the output power limitation control on the DSC control is not executed. Then at step S105, it is further determined whether or not an accelerator opening change rate, which shows how fast the accelerator opening changes, is larger than a rate threshold TV1 which is set an ordinary-driving rate threshold. Then at step S106, when automatic braking based on the PB control is now in operation, it is determined whether or not an amount of change in the accelerator opening, which is accumulated after start of the automatic braking, is larger than a change threshold TA1 which is set as an ordinary-driving change-amount threshold.

In a case there is a negative determination (NO) at any of the steps S104, S105 and S106, the processing proceeds to step S110 to perform the PB control, because it is determined that the value of the TTC to each of the objects recognized by the object recognizing block 11 has becomes equal to or less than a time of period provided by the activation timing. Hence, an activation command is sent from the control processing block 14 to the braking device 32 so that automatic braking can be performed.

In contrast, when there are positive determinations (YES) at the steps S104, S105 and S106, the processing proceeds to step S111 where the PB control is canceled. In this case, even if the TTC to each of the objects recognized by the object recognizing block 11 becomes equal to or less than the time of period provided by the activation timing, the activation command will not be sent from the control processing block 14 to the braking device 32, and the braking device 32 will not be activated automatically.

Further, during a performance of the output power limitation on the DSC process, the determination at step S101 may become YES, which allows the processing to proceed to step S107 and subsequent steps. At this step S107, an accelerator opening detected by the accelerator pedal sensor is compared with an opening threshold TH2 which is provided as a DSC threshold for the opening. By this comparison, it is determined whether the accelerator opening is larger than the opening threshold TH2. At step S108, it is determined whether or not the accelerator opening rate is larger than the opening rate threshold TV2 which is set for the DSC threshold for the change rate. Then at step S109, it is further determined whether or not an amount of change of the acceleration opening, TA1, accumulated since starting the automatic braking during the PB control is larger than a change amount threshold TA2 which is set in the DSC control In the present embodiment, the opening threshold TH2 for the DSC operation is set to be larger than the opening threshold TH1 for the ordinary driving. The opening rate threshold TV2 for the DSC operation is also set to be larger than the operating rate threshold TV1 for the ordinary driving. The change amount threshold TA2 for the DSC operation is also set to be larger than the change amount threshold TA1 for the ordinary driving. There thresholds are previously stored in the ROM 10B which is one of the memories provided in the vehicle control apparatus 10. Hence, the apparatus reads thresholds from the ROM 10B depending on performance or non-performance of the output power limitation on the DSC control. The thresholds for the ordinary driving can be corrected, and the corrected thresholds can be adopted as thresholds for the DSC control.

In a case where the determination at any of the steps S107, S108 and S109 is NO, the processing proceeds to step S110 to perform the PB control. By contrast, in a case where all the steps S107, S108 and S109 shows a YES determination, the processing proceeds to step S111 to cancel the PB control.

Further, when the output power limitation on the DSC control has been finished, the process at step S103 produces a YES determination at a timing immediately after the finish, resulting in proceeding to step S107 and subsequent steps thereafter. However, when a predetermined period of time has passed after finishing the output power limitation on the DSC control, the determination at step S103 becomes NO, resulting in processing proceeding to step S104 and subsequent steps thereafter. That is, during the period of time after finishing the output power limitation on DSC control, the DSC thresholds are set as thresholds which are for determining whether or not PB control cancelling conditions are met. By this setting of the DSC thresholds, the PB control is not canceled or suppressed from being canceled in the predetermined period of time provided after finishing the output power limitation on the DSC control. In this way, the present embodiment employs, as the PB control canceling conditions, the determining thresholds which are preset. The processing will be ended in this way.

Incidentally, as the determining thresholds for the PB control cancelling conditions, amounts which are unavailable in the ordinary driving state (an accelerator opening of 100% or more; for example, an accelerator opening of 100%) can be set, so that the PB control cannot be canceled by a driver's accelerator operation. Moreover, values which are available in the ordinary driving state (for example, an accelerator opening of 95%) can be set as the determining thresholds for the PB control canceling conditions, so it is possible to make the PB control from more difficult to cancel. In the present embodiment, for example, the determining threshold for the PB control canceling condition which realizes a suppressed cancellation of the PB control is given an accelerator opening of 95% which is available in the ordinary driving state. The accelerator opening available in the ordinary driving state can be a value in a range of 0 to 100%. In addition, the accelerator opening rate and/or the amount of change in the accelerator opening can be incorporated as determining thresholds for canceling the PB control and can be adjustably set in the same manner as that for the accelerator opening.

With reference to FIG. 3 showing a timing chart, the PB control provided by performing the process shown in FIG. 2 will now be described. The case shown in FIG. 3 exemplifies that a vehicle driver presses the accelerator pedal in a place such as a parking lot, and, during a period of time when the accelerator pedal is pressed, changes the shift lever position to the drive range D from the reverse range R. In addition, in this case, imagine that there is an obstacle in a forward area of the vehicle. In FIG. 3, part (a) shows how the accelerator opening changes over time, part (b) shows how the shift lever position changes over time, part (c) shows changes of performance/non-performance of the engine output of the vehicle depending on the DSC control, part (d) shows how conditions for cancelling the PB control change, and part (e) shows changes of activation/non-activation of the braking device 32 depending on the PB control. In the parts (c) and (e) of FIG. 3, solid lines show a case where the determining threshold serving as a condition for cancelling the PB control is set to be variable, and chain lines shows a case where such determining threshold is set as a constant amount directed to the ordinary driving state.

It is estimated that the driver presses the accelerator pedal and, with the accelerator pedal pressed, changes the shift lever position from the reverse range R to the drive range D (at time instant t11), which resulted in output power limitation of the vehicle based on the DSC control. In such a case, the determining threshold for cancelling the PB control may be given a constant amount for the ordinary driving. In this case, when the accelerator pedal is pressed deeply such that the accelerator opening becomes larger than the opening threshold TH1 and the accelerator opening rate becomes larger than the rate threshold TV1, the PB control is cancelled at time instant t12 at which the PB cancelling conditions are met. Accordingly, at time instant t13, the automatic braking is not activated provided that the TTC to an obstacle in front of the vehicle reaches the timing at which the safety device should be activated (refer to a dashed line in the part (e) of FIG. 3).

In contrast, in the present embodiment, the determining thresholds for canceling the PB control can be changed. During a period of time when the DSC control limits the output power of the vehicle, the determining thresholds are changed to amounts which make it more difficult to cancel the PB control more than when adopting thresholds directed to the ordinary driving state. For example, the opening threshold TH is changed to a larger amount, as shown. Hence, the PB control cancelling condition is not met at a time constant t12, whereby the PB control is not canceled. In this example, if the value of the TTC detected to an obstacle present in the forward area of the vehicle reaches a time instant t13 when the safety device should be activated, the automatic braking due to the PB control is activated (refer to a solid line in the part (e) of FIG. 3).

The present embodiment described above can provide the following advantageous effects.

In cases where, during a pressing operation on the accelerator pedal, the driver performs the foregoing predetermined shift-lever operation involving changes of shift-lever positions, the accelerator pressing operation will not cancel the PB control or resist the PB control from being canceled. Practically, when the DSC is active, the opening threshold TH which serves as the PB control cancelling condition is set to be larger, the rate threshold TV is set to be higher, and the change threshold TA is set to be larger, respectively, compared with those thresholds which are set for the DSC activation. By this threshold setting, it is possible to provide the vehicle with a more appropriate driving support toward an object with which the vehicle may collide, when the driver performs both the accelerator a shift-lever operations which are unusual in the ordinary driving.

In addition, in a period of time in which the driver's predetermined shift-lever position change causes the vehicle output power to be limited by the DSC, the PB control will not be canceled or will not be made to be easier to cancel. The DSC becomes active by a trigger which is produced by a driver's erroneous pressing of the accelerator pedal. Hence, during a period of time in which the vehicle output power is limited, the driver's driving operation may still be unstable. Accordingly, in such a vehicle power-limited state, the PB control will not be canceled or will not be canceled easily. It is therefore possible to provide the vehicle with a more appropriate driving support toward an object with which the vehicle is likely to collide.

Moreover, in a period of time ranging from completion of the vehicle power limitation based on the DSC to a timing at which a predetermined period of time elapses, the PB control will not be canceled or will not be canceled easily. This configuration is due to the fact that the driver's driving operations may be unstable for a while after the power limitation control ends by responding to the vehicle speed and acceleration which have becomes smaller than their thresholds. However, by setting the foregoing period of time, more appropriate driving assistance can be provided for avoiding a collision with an object or reducing damage caused by collisions with objects.

Other Embodiments

The gist of the present invention will not be limited to that described in the foregoing embodiment, and can be developed further, as will be described in the following exemplifications.

In the foregoing embodiment, the conditions for cancelling the PB control are set to include the three conditions consisting of an opening of the accelerator, an opening rate at which the accelerator is pressed, and an amount of change of the accelerator opening which is accumulated from start of the automatic braking. By way of example, the conditions can be set to include only one or two of the three conditions. For example, the conditions for cancelling the PB control can be set to include only "the accelerator opening is to be larger than the opening threshold TH". In this case, the processes at steps S108 and S109 of FIG. 2 are omitted from the entire preprocessing.

Another embodiment for the DSC can be provided such that, under activation of the DSC, the comparison process is omitted from being performed between the information about the accelerator pressing operation and the determining threshold for the PB control cancelling conditions, so that, during this DSC activation, the PB control cannot be cancelled by pressing of the accelerator pedal. This embodiment can be performed such that the processes at steps S107 to S109 in FIG. 2 are removed from the entire processing and the affirmative determination at step S101 makes the processing proceed to step S111.

The foregoing embodiment is applied to the system in which the foregoing predetermined shift-lever position change, that is, shift lever positions are changed under a driver's accelerator pressing operation, results in limiting the output power of the vehicle. In another embodiment, the present invention can be applied to a system in which the vehicle output power is not limited even if the predetermined shift-lever position change is detected.

Another embodiment is also concerned with the determining thresholds used as the conditions for cancelling the PB control. In the foregoing embodiment, during a period of time starting from end of the output limitation on the DSC process to a time instant at which a predetermined period of time elapse, the determining thresholds are set at those for DSC performance. This can further be modified such that such determining thresholds are switched over to those for the vehicle ordinary driving on completion of limiting the vehicle output power under the DSC.

Further, in the foregoing embodiment, the PB control is set such that the PB control cannot be canceled or can be more difficult to be cancelled in a duration in which the vehicle output power is limited by conducting the DSC. By way of example, however, the PB control can be set not to cancel the PB control or to resist cancellation of the PB control only in a part of a period of time in which the vehicle output power is limited by conducting the DSC. Additionally, the PB control can be set not to cancel the PB control or to resist cancellation of the PB control in a preset duration elapsed from a time at which it is determined that the foregoing predetermined shift-lever position change has been carried out.

The foregoing components are conceptual and not limited to those described in the foregoing embodiments. For example, functions realized by one of the components can be divided into a plurality of components, or, among such components, functions provided by two or more components can be combined together in one function.

While the present disclosure has been described in connection with what is presently considered to be practical exemplary embodiments, it is to be understood that the disclosure is not limited to the disclosed embodiments and configurations, but, on the contrary, it intended to cover various modifications and equivalent arrangements included within the spirit and scope of the appended claims. Further, the spirit and scope of the present disclosure also includes various combinations and embodiments as well as other combinations and embodiments including only one element thereof, more than thereof, or less than thereof.

PARTIAL REFERENCE SIGNS LIST 10 vehicle control apparatus
11 object recognizing block
12 limited value calculating block
13 PCS-activation determining block
14 control processing block
15 DSC-activation determining block
21 radar apparatus
22 imaging apparatus
31 alarm device
32 braking device

What is claimed is:

1. A vehicle control apparatus, comprising:
a processor;
a non-transitory computer-readable storage medium; and
a set of computer-executable instructions stored on the non-transitory computer-readable storage medium that cause the processor to:
  recognize an object around a vehicle;
  perform automatic braking control for braking the vehicle in response to determining a possibility of collision of the vehicle with the object;
  cancel the automatic braking control in response to a driver in the vehicle depressing an accelerator pedal of the vehicle to a predetermined depressing state; and
  determine whether or not the driver has performed a predetermined shift-lever position change, the predetermined shift-lever position change being defined as a driver's operation of changing positions of a shift lever of the vehicle from a reverse range R to a drive range D or from the drive range D to the reverse range R in a state in which the driver depresses an accelerator pedal of the vehicle,
wherein
cancellation of the automatic braking control is prohibited or resisted in response to the driver depressing the accelerator pedal, in a case where the processor determines that the predetermined shift-lever position change has been performed, and
the automatic braking control is cancelled by a cancelling process of the processor in response to the driver depressing the accelerator pedal to the predetermined depressing state in a case where the processor determines that the predetermined shift-lever position change has not been performed.

2. The vehicle control apparatus of claim 1, wherein
the predetermined depressing state includes a state in which an opening of the accelerator pedal becomes larger than a preset opening threshold; and
the preset opening threshold is increased such that the automatic braking control is not canceled or resisted from being canceled, in response to determining that the predetermined shift-lever position change has been performed.

3. The vehicle control apparatus of claim 2, wherein
the predetermined depressing state includes a state in which an opening of the accelerator pedal becomes larger than a preset opening threshold; and
the preset opening threshold is increased such that the automatic braking control is not canceled or resisted from being canceled, in response to determining that the predetermined shift-lever position change has been performed.

4. The vehicle control apparatus of claim 3, wherein
the predetermined depressing state includes a state in which the driver's depressing of the accelerator pedal is performed at a rate which becomes larger than a preset rate threshold; and
the preset rate threshold is increased such that the automatic braking control is not canceled or resisted from being canceled, in response to determining that the predetermined shift-lever position change has been performed.

5. The vehicle control apparatus of claim 4, wherein
the predetermined depressing state includes a state in which, when braking the vehicle based on the automatic braking control has been started, an amount of change of opening of the accelerator pedal accumulated over an elapsed time from start of the automatic braking control becomes larger than a preset change threshold; and
the preset change threshold is increased such that the automatic braking control is not canceled or resisted from being canceled, in response to determining that the predetermined shift-lever position change has been performed.

6. The vehicle control apparatus of claim 5, wherein the set of computer-executable instructions stored on the non-transitory computer-readable storage medium further causes the processor to:
limit an output power of the vehicle in response to determining that the predetermined shift-lever position change has been performed; and
stop or resist the cancellation of the automatic braking control, in response to the driver depressing the accelerator pedal, for a period of time in which the output power of the vehicle is limited.

7. The vehicle control apparatus of claim 6, wherein the set of computer-executable instructions stored on the non-transitory computer-readable storage medium further causes the processor to:
determine whether or not a preset period of time has elapsed since an end of limitation of the output power of the vehicle; and
stop or resist the cancellation of the automatic braking control, in response to the driver depressing the accelerator pedal, for a period of time from an end of limitation of the output power of the vehicle.

8. The vehicle control apparatus of claim 1, wherein
the predetermined depressing state includes a state in which the driver's depressing of the accelerator pedal is performed at a rate which becomes larger than a preset rate threshold; and
the preset rate threshold is increased such that the automatic braking control is not canceled or resisted from being canceled, in response to determining that the predetermined shift-lever position change has been performed.

9. The vehicle control apparatus of claim 8, wherein
the predetermined depressing state includes a state in which, when braking the vehicle based on the automatic braking control has been started, an amount of change of opening of the accelerator pedal accumulated over an elapsed time from start of the automatic braking control becomes larger than a preset change threshold; and
the preset change threshold is increased such that the automatic braking control is not canceled or resisted from being canceled, in response to determining that the predetermined shift-lever position change has been performed.

10. The vehicle control apparatus of claim 9, wherein the set of computer-executable instructions stored on the non-transitory computer-readable storage medium further causes the processor to:
limit an output power of the vehicle in response to determining that the predetermined shift-lever position change has been performed; and
stop or resist the cancellation of the automatic braking control, in response to the driver depressing the accelerator pedal, for a period of time in which the output power of the vehicle is limited.

11. The vehicle control apparatus of claim 10, wherein the set of computer-executable instructions stored on the non-transitory computer-readable storage medium further causes the processor to:
determine whether or not a preset period of time has elapsed since an end of limitation of the output power of the vehicle; and
stop or resist the cancellation of the automatic braking control, in response to the driver depressing the accelerator pedal, for a period of time from an end of limitation of the output power of the vehicle performed.

12. The vehicle control apparatus of claim 1, wherein
the predetermined depressing state includes a state in which, when braking the vehicle based on the automatic braking control has been started, an amount of change of opening of the accelerator pedal accumulated over an elapsed time from start of the automatic braking control becomes larger than a preset change threshold; and
the preset change threshold is increased such that the automatic braking control is not canceled or resisted from being canceled, in response to determining that the predetermined shift-lever position change has been performed.

13. The vehicle control apparatus of claim 1, wherein the set of computer-executable instructions stored on the non-transitory computer-readable storage medium further causes the processor to:
limit an output power of the vehicle in response to determining that the predetermined shift-lever position change has been performed; and
stop or resist the cancellation of the automatic braking control, in response to the driver depressing the accelerator pedal, for a period of time in which the output power of the vehicle is limited.

14. The vehicle control apparatus of claim 13, wherein the set of computer-executable instructions stored on the non-transitory computer-readable storage medium further causes the processor to:
determine whether or not a preset period of time has elapsed since an end of limitation of the output power of the vehicle performed; and
stop or resist the cancellation of the automatic braking control, in response to the driver depressing the accelerator pedal, for a period of time from an end of limitation of the output power of the vehicle.

15. A vehicle control method, comprising:
an object recognizing step that recognizes an object around a vehicle;
a braking controlling step that performs automatic braking control for braking the vehicle in response to determining a possibility of collision of the vehicle with the object recognized by the object recognizing step, and cancels the automatic braking control in response to a driver in the vehicle depressing an accelerator pedal of the vehicle to a predetermined depressing state; and
an operation determining step that determines whether or not the driver has performed a predetermined shift-lever position change, the predetermined shift-lever position change being defined as a driver's operation of changing positions of a shift lever of the vehicle from a reverse range R to a drive range D or from the drive range D to the reverse range R in a state in which the driver depresses an accelerator pedal of the vehicle,
wherein
the braking controlling step prohibits cancellation of the automatic braking control or resists the cancellation of the automatic braking control in response to the depressing the accelerator pedal, in a case where the operation determining step determines that the predetermined shift-lever position change has been performed, and
the automatic braking control is cancelled in the braking controlling step in response to the driver depressing the accelerator pedal of the vehicle to the predetermined depressing state in a case where the operation determining step determines that the predetermined shift-lever position change has not been performed.

16. The vehicle control method of claim 15, comprising
an output limiting step that limits an output power of the vehicle in response to determining by the operation determining step that the predetermined shift-lever position change has been performed,
wherein
the braking controlling step prohibits the cancellation of the automatic braking control or resists the cancellation of the automatic braking control, in response to the ti depressing the accelerator pedal, for a period of time in which the output power of the vehicle is limited by the output limiting step.

17. The vehicle control method of claim 16, comprising
an elapse-time determining step that determines whether or not a preset period of time has elapsed since an end of limitation of the output power of the vehicle performed by the output limiting step; and
the braking controlling step prohibits the cancellation of the automatic braking control or resists the cancellation of the automatic braking control, in response to the depressing the accelerator pedal, for a period of time from an end of limitation of the output power of the vehicle performed by the output limiting step.

* * * * *